US008741395B2

(12) United States Patent
Paulauskas et al.

(10) Patent No.: US 8,741,395 B2
(45) Date of Patent: Jun. 3, 2014

(54) APPARATUS AND METHOD FOR CARBON FIBER SURFACE TREATMENT

(75) Inventors: Felix L. Paulauskas, Knoxville, TN (US); Daniel M. Sherman, Knoxville, TN (US)

(73) Assignees: UT-Battelle, LLC, Oak Ridge, TN (US); Remaxco Technologies, LLC, Knoxville, TN (US)

( * ) Notice: Subject to any disclaimer, the term of this patent is extended or adjusted under 35 U.S.C. 154(b) by 0 days.

(21) Appl. No.: 13/555,476

(22) Filed: Jul. 23, 2012

(65) Prior Publication Data

US 2013/0048485 A1   Feb. 28, 2013

Related U.S. Application Data

(63) Continuation of application No. 11/159,006, filed on Jun. 22, 2005, now Pat. No. 8,227,051.

(60) Provisional application No. 60/582,869, filed on Jun. 24, 2004.

(51) Int. Cl.
*H05H 1/24* (2006.01)
*H05H 1/00* (2006.01)

(52) U.S. Cl.
USPC ........... 427/569; 427/553; 427/559; 427/113; 427/115

(58) Field of Classification Search
USPC .......................... 427/569, 553, 115, 113, 559
See application file for complete search history.

(56) References Cited

U.S. PATENT DOCUMENTS

| | | | |
|---|---|---|---|
| 4,717,516 A | | 1/1988 | Isaka et al. |
| 5,019,210 A | | 5/1991 | Chou et al. |
| 5,147,678 A | * | 9/1992 | Foerch et al. ................. 427/562 |
| 5,344,462 A | * | 9/1994 | Paskalov et al. ............. 8/115.52 |
| 5,357,005 A | | 10/1994 | Buchwalter et al. |
| 5,369,012 A | | 11/1994 | Koontz et al. |
| 5,976,992 A | * | 11/1999 | Ui et al. ........................ 438/788 |
| 6,372,192 B1 | | 4/2002 | Paulauskas et al. |
| 6,514,449 B1 | | 2/2003 | Paulauskas et al. |
| 6,648,973 B2 | | 11/2003 | Drzal et al. |
| 6,649,225 B2 | | 11/2003 | Drzal et al. |
| 2002/0037374 A1 | | 3/2002 | Gherardi et al. |
| 2003/0116281 A1 | * | 6/2003 | Herbert et al. ............. 156/379.6 |
| 2004/0197633 A1 | | 10/2004 | Yamamoto et al. |
| 2004/0245087 A1 | | 12/2004 | Lee |

FOREIGN PATENT DOCUMENTS

JP   2004244759 A   9/2004

OTHER PUBLICATIONS

Translated abstract of JP 2004244759 (2004).
Delmonte, "Technology of Carbon and Graphite Fiber Composites", 1981, pp. 177-197, Van Nostrand Reinhold, New York.
Donnet et al., "Carbon Fibers", Third Edition, 1998, pp. 180-189, Marcel Dekker, New York.
Pebbles, Carbon Fibers—Formation, Structure, and Properties, 1995, pp. 128-135, CRC Press, Boca Raton.
Wertheimer et al., "Plasma Treatment of Polymers to Improve Adhesion", pp. 139-173 in Mittal and Pizzi, eds., 1999, Marcel Dekker, New York.
Sittig, ed., "Carbon and Graphite Fibers", 1980, pp. 191-229, Noyes Data Corp., Park Ridge, NJ.
Chan, "Polymer Surface Modification and Characterization", 1994, pp. 225-263, Hanser Publishers, Munich.
Li et al., "Application of Plasma technologies in fibre reinforced polymer composites", 1977, Comp. Part A, vol. 28A, pp. 73-86.
Rahel and Sherman, "The transition from a filamentary dielectric barrier discharge to a diffuse barrier discharge in air at atmospheric pressure", 2005, J. Phys. D: Appl. Phys. 8.
Cech, "New Progress in composite interphases: a use of plasma technologies", Proc. Int'l Conf. on Fibre-Reinf. Composites, Newcastle Upon Tyne, Sep. 13-15, 2000.
Montes-Moran et al. Raman spectroscopy study of HM carbon fibers, 2002 Carbon 40, pp. 845-855.
Boudou et al., Oxygen plasma modification of pitch-based isotropic carbon fibres, 2003, carbon 41, pp. 41-56.
Bismarck et al., "Influence of oxygen plasma treatment of PAN-based carbon fibers on their electrokinetic and wetting properties", 1999, J. Coll. and Interf. Sci, 210, pp. 60-72.
Oyama et al., Surface characterization of PVP-sized and oxygen plasma-treated carbon fibers, 1998, Surface and Interface Anal. 26, pp. 39-55.
Huang et al., "The uniform treatment of carbon fiber surface in three-directional orthogonal fabric by oxygen plasma", 2003, J. Mat. Sci, 38, 759-66.
Yokoyama et al., "The mechanism of the stabilization of glow plasma at atmospheric pressure", 1990, J. Phys. D: Appl. Phys. 23, pp. 1125-1128.
Tsai et al., "Surface modification of fabrics using a one-atmosphere glow discharge plasma to improve fabric wettability", 1997, Textile Rev. J. 67(5), pp. 359-369.

* cited by examiner

*Primary Examiner* — Duy Deo
*Assistant Examiner* — Mahmoud Dahimene
(74) *Attorney, Agent, or Firm* — Scully, Scott, Murphy & Presser, P.C.

(57) ABSTRACT

An apparatus and method for enhancing the surface energy and/or surface chemistry of carbon fibers involves exposing the fibers to direct or indirect contact with atmospheric pressure plasma generated using a background gas containing at least some oxygen or other reactive species. The fiber may be exposed directly to the plasma, provided that the plasma is nonfilamentary, or the fiber may be exposed indirectly through contact with gases exhausting from a plasma discharge maintained in a separate volume. In either case, the process is carried out at or near atmospheric pressure, thereby eliminating the need for vacuum equipment. The process may be further modified by moistening the fibers with selected oxygen-containing liquids before exposure to the plasma.

20 Claims, 2 Drawing Sheets

APPARATUS AND METHOD FOR CARBON FIBER SURFACE TREATMENT

CROSS-REFERENCE TO RELATED APPLICATION

This application is a continuation of U.S. application Ser. No. 11/159,006 filed Jun. 22, 2005 which claims the benefit of Provisional Patent Application No. 60/582,869 filed on Jun. 24, 2004 by the present inventors, the entire disclosure of which is incorporated herein by reference.

STATEMENT REGARDING FEDERALLY SPONSORED RESEARCH

This invention was made with Government support under Contract No. DE-AC05-00OR22725 awarded by the U. S. Department of Energy to UT-Battelle, LLC, and the Government has certain rights in this invention.

BACKGROUND OF THE INVENTION

1. Field of the Invention

The invention pertains to apparatus and methods to treat carbon and graphite materials, and more particularly to systems and methods for plasma assisted treatment of carbon fibers to improve their surface characteristics for use in polymer matrix composites.

2. Description of Related Art

Carbon fiber composites require that the carbon fibers be bonded to a resin to form a structurally sound composite. Virgin (untreated) carbon fibers are well known to have a low chemical affinity to resins and other polymeric based materials. Usually the carbon fiber must be treated to increase the amount of chemical affinity to the matrix resin. The adhesive characteristics of the resin to the carbon fiber are dominated by the' surface energy of the carbon fiber. Through surface treatment, the addition of oxygen atoms to the surface of the carbon fiber has been demonstrated to increase the surface energy of the carbon fiber. Standard industrial processes for increasing the surface energy of carbon fiber are the use of gaseous oxidative species (ozone) or a liquid electrostatic technique. These common techniques result in bound oxygen concentrations of ~6%. There are other techniques, i.e. chemical coupling agents, liquid oxidizing agents, low pressure gas plasma, chemical solutions, vapor phase deposition, chemical etching, and electropolymerization; however these processes are not commonly used in industry.

The use of oxygen-containing plasmas to modify the surface of carbon fibers has been previously examined. The advantages are: increasing the level of oxygen onto the surface; increasing the surface energy; providing an oxidative treatment of the top surface creating a different type of oxidative chemical groups; and improving adhesion with resin by improving the chemical affinity of the resin and fiber surface. The disadvantages are: undesirable mechanical surface effects; surface ablation, etching, erosion, or pitting leading to the creation of localized surface irregularities on the carbon fiber; removal of the outmost structures and morphology; general structural damage to the fiber; and reduced mechanical strength.

U.S. Pat. No. 6,514,449 teaches the use of microwave energy and plasma to modify the surface topography of carbon fiber. General discussions of fiber surface modification by plasma processing may be found in several references [Mittal, K. L. and Pizzi, A., "Adhesion Promotion Techniques. Technological Applications," Marcel Dekker, pp. 67-76 and pp. 139-73. (1999); J. B. Donnet, T. K. Wang, S. Rebouillat and J. C. M. Peng, "Carbon Fibers," Third Edition, Marcel Dekker, Inc., pp. 180-9 (1998)]. These teachings address the modification of surface morphology or surface chemistry as a means of modifying interactions between fiber and matrix in a composite.

Low-pressure (3-5 Torr) plasma processing has been described for several different operations relating to carbon fiber production (see Paulauskas et al., U.S. Pat. No. 6,372, 192), In this patent it was suggested that small amounts of oxygen could be admitted into a low-pressure microwave plasma to achieve some surface treatment of the fibers.

It is widely recognized that low-pressure plasma processes are less desirable to industrial operations because of the high cost, space, and maintenance requirements associated with vacuum systems [see C.-M. Chan, Polymer Surface Modification and Characterization, Hanser Pub., 1994, pp. 225-63]. A viable plasma-based process that could operate at near ambient pressures while achieving adequate modification of the fibers was therefore needed and was not available based on prior teachings in the literature.

Objects and Advantages

Objects of the present invention include the following: providing an apparatus for treating the surface of carbon fibers prior to their incorporation into composites; providing an apparatus for more rapid and cost-effective treatment of carbon fibers by exposure to reactive oxidative species; providing a method for carbon fiber treatment that is faster and requires less physical space; providing a method for carbon fiber treatment that does not require a vacuum or low-pressure plasma; providing a method of carbon fiber treatment in which the fiber is contacted by a diffuse plasma in order to avoid the deleterious effects of a concentrated or filamentary plasma on the fiber; and, providing a method for treating carbon fibers by exposing them to reactive species originating in a plasma discharge without exposing the fibers to contact with the plasma itself. These and other objects and advantages of the invention will become apparent from consideration of the following specification, read in conjunction with the drawings.

SUMMARY OF THE INVENTION

According to one aspect of the invention, an apparatus for treating carbon fiber comprises: a treatment chamber adapted to maintain substantially one atmosphere pressure; a plasma discharge containing selected gases; and, a means for supporting the carbon fiber within the treatment chamber at a location wherein the fiber will not contact a filamentary plasma discharge but will be exposed to desired reactive species generated by the plasma, whereby the surface of the fiber is modified through the exposure in the chamber at a selected temperature.

According to another aspect of the invention, a method for treating carbon fiber comprises exposing the fiber at a selected temperature and substantially one atmosphere pressure to a gas containing at least one reactive species, the reactive species generated by a plasma discharge, while avoiding direct contact between the fiber and a filamentary plasma discharge, whereby the surface energy of the carbon fiber is modified by exposure to the reactive species.

According to another aspect of the invention, an apparatus for treating carbon fiber comprises a treatment chamber having a first volume adapted to contain the carbon fiber during treatment at substantially one atmosphere pressure and a second volume wherein a plasma is established; a source of selected gases into the second volume, whereby reactive species may be created within the plasma; and, at least one conduit between the first and second volumes whereby the reactive species from the plasma may be transported to the fiber and the fiber surface energy is modified by exposure in the chamber at a selected temperature while avoiding direct contact between the fiber and the plasma.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

DETAILED DESCRIPTION OF THE INVENTION

Figure 1:
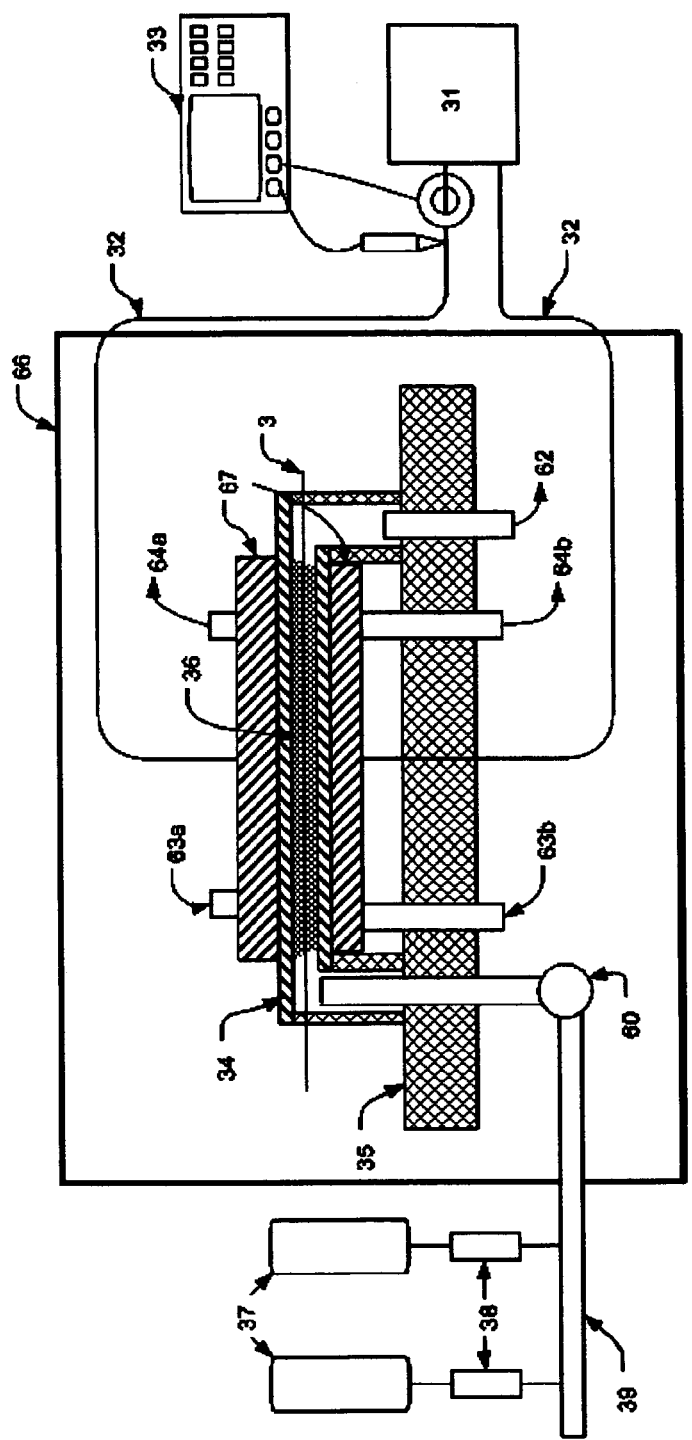
FIG. 1 is a schematic diagram of one embodiment of the present invention adapted for atmospheric pressure plasma processing.

In its most general form, the invention is designed to modify the surface characteristics of carbon fibers by exposing the fibers either directly within a bulk volume of atmospheric plasma (direct treatment) or to a flow of chemically active species originating in an atmospheric plasma (indirect treatment). Properties that can be altered include the surface energy, number and type of chemically active binding sites, the surface area and surface roughness. Carbon fibers are placed within a plasma device capable of generating a sufficient volume of ionized gas, in a manner that minimizes filamentary current structure within the plasma. The fiber is maintained within the plasma for a period of time to allow for the alteration of the surface properties, typically tens of seconds but generally less than tens of minutes. The plasma is generated in such a manner as to promote the production of chemical species necessary for the desired surface alteration.

Direct Exposure Plasma Treatment

To modify the surface energy, increase the surface area, and roughen the surface of the fiber: The fiber is pulled or placed into an atmospheric plasma device exposing the fiber to direct contact with the chemical active species generated by and comprising the plasma. The atmospheric pressure plasma device is configured to operate in a non-filamentary mode using a background gas preferably comprising air or any other oxygen containing gas mixtures including pure oxygen. The plasma operating conditions are adjusted to yield the desired surface modifications within the required residence time. Typical adjustable parameters include the size of the plasma volume, the composition of the processing gas, gas flow rates, and the energizing conditions of the electrical device generating the atmospheric plasma. These simple adjustments in the operating parameters allow for the generation of selected chemical species responsible for particular surface modifications and for varying degrees of surface topography effects.

Indirect Exposure Plasma Treatment

To modify the surface energy of the fiber, and alter the number and type of chemically active sites on the surface of the fiber: The fiber is pulled or placed into the exhaust flow from an atmospheric plasma device exposing the fiber to contact with the convected chemical active species generated by and comprising the plasma. The atmospheric pressure plasma device is configured to operate using background gas preferably comprising air, or any other oxygen containing gas mixtures including pure oxygen, that promotes the transport of short-lived reactive oxidative species to the fiber via a sufficiently high exhaust velocity. The plasma operating conditions are adjusted to yield the desired surface modifications within the required residence time. Typical adjustable parameters include the size of the plasma volume, the composition of the processing gas, gas flow rates, and the energizing conditions of the electrical device generating the plasma. These simple adjustments in the operating parameters allow for the generation of selected chemical species responsible for particular surface modifications. Deleterious effects on fiber surface topography may be minimized by the indirect exposure process because the fibers are located away from the bulk of the plasma and do not undergo direction bombardment.

The oxidative chemistry required to carry out the surface modification is fundamentally complex, so the addition of plasma processing increases the degree of complexity of the overall process kinetics. This added complexity arises from the generation of gaseous concentrations of both short-lived and excited gas species as well as energetic photons. The additional reactive species and photons dramatically alter the overall reaction kinetics governing the oxidative processes. Experimental testing with a variety of gas mixtures confirmed the importance of including oxygen during the process.

It will be understood that although air is a preferred working gas for the plasma device, other mixtures of processing gases comprising some oxygen mixture or oxygen containing gas may be suitable for particular applications. Examples include, but are not limited to: dry or moist air; nitrogen; oxygen; nitrogen oxides; carbon dioxide; helium, argon, or other inert gases; hydrogen and hydrogen-containing gases including ammonia; and mixtures thereof. Reactive species that may be created by the plasma source include the following: $O_2$, $O_x$, $O$, $N_xO_y$, $H_xO_y$, as well as ions, radicals, excited states and metastables of any of the precursor gases.

As noted above, generally surface treatment is an oxidative process; however, other useful modification processes generally referred to as "grafting" may require a substantially oxygen-free plasma. Plasma grafting is a technology by which surface properties of a polymer or carbon fiber can be tailored through the proper selection of gases to generate very specific chemical groups onto the surface of carbon fiber, making the fiber more compatible with a specific matrix resin. For these applications, useful gases may include the following: light hydrocarbons (C-1 through C-8), which may be saturated or unsaturated, open chain or cyclic; $NH_3$ and other amines; $H_2$; alcohols; organic acids; ethers; ketones; esters; and aldehydes.

A variety of atmospheric pressure plasma devices have been built during the course of the present research effort. These devices are generally based on the approach taught in U.S. Pat. Nos. 5,387,842 and 5,414,324. These devices have consisted of various parallel electrode designs that have included parallel plates and rods. In these designs either one or both of the electrodes are insulated. The processing gas and carbon fiber was fed through a gap or spacing between the electrodes. The electrodes were energized with an audio frequency power supply and operated in such a manner as to promote a diffuse dielectric barrier type discharge.

The atmospheric pressure plasma processing equipment consists of a gas supply system, a plasma reactor, and a high voltage power supply as shown in FIG. 1. The gas supply system consists of a gas manifold 39 with connections for up to four different gas bottles 37 (two of which are shown) with independent meters 38. The gas manifold delivers temperature controlled, typically heated by heater 60, mixed gas to the plasma reactor. The plasma reactor consists of temperature controlled electrodes 67, (via a heated oil recirculated through their interiors through inlets 63a, 63b and outlets 64a, 64b), dielectrics 34, 35, and an enclosure 66. Dielectric materials included borosilicate glass, quartz, and alumina. The enclosure 66 for the plasma reactor is necessary both to manipulate the processing gas into and to exhaust gas out of the gap between the electrodes where the plasma is formed and the carbon fibers were processed. The high voltage system 31 consists of an audio amplifier or power inverter coupled to a high voltage transformer. The high voltage from the transformer is connected via high voltage wires 32 to the electrodes within the plasma reactor. Electrical diagnostics consisting of a high voltage probe and current ring connected to an oscilloscope 33 monitor the electrical parameters of power supply.

The plasma device used in the following examples consisted of a two insulated parallel plates that were enclosed by a first set of walls used to confine the background gas and set the spacing between the electrodes and a second enclosure used to confine the exhaust gases prior to being drawn into the building exhaust system. The original system had oil-heated electrodes, were insulated with Pyrex glass plates and had a plasma gap size smaller than 3 millimeters. The fiber and the lower electrode where electrically connected together either to ground, with the upper insulated electrode connected to the high voltage, or to the high voltage with the upper insulated electrode connected to ground.

Nominal results for direct and indirect atmospheric plasma treatment of carbon fiber are presented in the following examples. In order to eliminate the effects of fiber type, the base material for all tests was the same untreated, unsized, conventionally manufactured PAN based carbon fiber: large tow (50 k filaments), FORTAFIL F3(C)™ Continuous Carbon Fiber [Fortafil Fibers, Inc., 121 Cardiff Valley Road, Rockwood. Tenn. 37854]. It will be appreciated that the inventive process is not limited to any particular type of carbon fiber, but may be applied to carbon fibers derived from polyacrylonitrile (PAN), pitch, rayon, lignin, cellulose, or other thermoplastic-based fiber materials.

Chemical surface analysis on the carbon fibers was performed using X-ray Photoelectron Spectroscopy (XPS). Each average result represents a minimum of five to seven measurements taken from different positions along a sample of fiber. Each measurement taken at each position was an average of 16-20 individual XPS scans. Tables reflect XPS surface analysis data for surface elementary oxygen concentration only.

EXAMPLES

Example 1

Direct Exposure

Carbon fibers (unsized) were placed on a dielectric support in a parallel-plate atmospheric plasma reactor substantially as shown in FIG. 1. A voltage of 7 kV at 8 KHz was applied to the fiber with the walls grounded, and the fibers were directly exposed to the plasma. The surface of the dielectric was about 90° C. during treatment. Table 1 shows exposure time and gas composition for each test. The surface oxygen concentration (given as %±STD) was measured freshly after exposure as well as after 5 weeks of storage under vacuum. For comparison, a typical value for unprocessed carbon fiber is about 4.4±1.0 and for conventionally processed (ozone treated) fiber it is about 6.2±1.1. It can be seen that the plasma treated fibers have substantially greater surface oxygen content, even after prolonged storage under vacuum.

TABLE 1

General comparison of atmospheric plasma processed samples and conventionally processed samples.

| Sample | Gas | Time, s | Surface O (fresh) | Surface O (stored) |
|---|---|---|---|---|
| A | Dry air | 70 | 23.59 ± 6.23 | 7.7 ± 0.9 |
| B | Dry air | 180 | 29.80 ± 5.47 | 12.7 ± 2.7 |
| C | 100% $O_2$ | 70 | 29.09 ± 9.56 | 5.3 ± 0.9 |
| D | 100% $O_2$ | 190 | 20.85 ± 11.38 | 10.8 ± 1.8 |
| E[a] | 100% $O_2$ | 150 | 28.06 ± 3.69 | 18.3 ± 2.3 |

[a]Fibers were moistened with distilled water before treatment

Example 2

Direct Exposure

A test was conducted to determine the effectiveness of very short processing times. In this test, a cylindrical plate plasma device was used. This device was cylindrical rather than planar, but its cross section (taken along the axis of the cylinder) was the same as that shown in FIG. 2A. A voltage of 7.5 kV at 8 kHz was applied to the fiber and the chamber walls were not heated. The result is shown in Table 2.

TABLE 2

Short processing time in a cylindrical reactor

| Sample | Gas | Time, s | Surface O (fresh) |
|---|---|---|---|
| 2 | Air[a] | 75 | 8 ± 0.8 |

[a]Synthetic dry air.

Example 3

Direct Exposure

The effect of longer processing time was investigated using a setup identical to that described in Example 1. The results are shown in Table 3.

TABLE 3

Long processing time in a parallel plate reactor

| Sample | Gas | Time, s | Surface O (fresh) | Surface O (stored) |
|---|---|---|---|---|
| 3 | Air | 180 | 12.7 ± 2.7 | 8.3 ± 1.6 |
| 4 | 100% $O_2$ | 190 | 10.8 ± 1.8 | |

Example 4

Direct Exposure

Considering the high electrical conductivity of the carbon fiber, the fiber itself can be used as one of the electrodes either in the plasma device or biased downstream of a plasma device. Biasing the fibers to a particular potential may affect the type of ions that are preferentially driven to the surface of the fiber. In this test, the cylindrical reactor described in Example 2 was used. Table 4 shows data for samples processed within the plasma with the fibers either connected to electrical ground or energized by the high voltage used to generate the plasma discharge.

TABLE 4

Effect of electrical bias on fiber processing time in a parallel plate reactor

| Sample | Gas | Time, s | Sample bias | Surface O (fresh) |
|---|---|---|---|---|
| 5 | 100% $O_2$ | 75 | ungrounded | 6.8 ± 1.2 |
| 6 | 100% $O_2$ | 75 | grounded | 3.7 ± 1.2 |

It will be appreciated by those skilled in the art that the sample may be biased to any selected potential from ground potential to energized as shown in the example, as well as given a DC bias at any selected voltage (for example, as a means of attracting or repelling particular chemical species within the plasma). It will further be appreciated that any such bias applied to the fiber may be held constant throughout the process or may be changed as the process continues in order to adjust to changing fiber properties or to provide a degree of dynamic control of the overall process kinetics.

Example 5

Direct Exposure

The use of liquid agents to wet the surface of the fiber prior to direct exposure to the plasma may allow a greater quantity of oxygenated species to be preferentially located at the surface of the fiber. Dissociation of the liquid during plasma processing releases the oxygen species. Clearly, a small quantity of water or other oxygen containing liquid stoichiometrically provides a large quantity of oxygen in the vicinity of or even directly onto the surface of the fiber. Water, commonly thought to be of negative impact to the surface energy during the carbon fiber production, is an example of a liquid that can be used to increase the surface energy. Several runs were made using fiber that had been slightly moistened with distilled water immediately before exposure to the plasma, in a parallel plate reactor setup as described in Example 1, and in a cylindrical reactor as described in Example 2, and the results are shown in Table 5. It will be appreciated that this principle may be extended to other oxygen containing liquids for similar benefits. Examples of oxygen containing fluids include water and other low molecular weight organic compounds containing single or multiple carbonyl, carboxyl, alcohol, ester, or ether groups. The preference for low molecular weight liquids is based on two considerations. First, if the viscosity of the liquid is too high, it will be difficult to wet the fibers with a thin, uniform layer of the liquid. Second, as the molecular weight increases, the amount of oxygen decreases relative to other constituents (typically carbon) and so the usefulness of the fluid to deliver oxygen is proportionately reduced. It will be clear that the actual type and molecular weight of such fluids will vary to some degree with particular applications, but Applicants prefer to use a fluid whose viscosity is less than about 500 centipoise (cp). It will be appreciated that the viscosity of a selected liquid will vary as the process temperature varies. Thus, the choice of liquid will depend to some degree on the choice of process temperature. Other composite manufacturing processes requiring a particular matrix resin may also require plasma processing gases containing hydrogen/nitrogen i.e. methane or ammonia. The inventive atmospheric plasma surface treatment may be further modified by the addition of these species to the plasma in order to generate the selected chemical groups on the fiber surface.

TABLE 5

Plasma processing using pre-moistened fibers

| Sample | Gas | Time, s | Surface O (fresh) | Surface O (stored) |
|---|---|---|---|---|
| 7[a] | 100% $O_2$ | 150 | 18.3 ± 2.3 | 11.8 ± 2.3 |
| 8[b] | 80% $O_2$ 20% $N_2$ | 150 | 10 ± 2 | |

[a]7 kV at 8 kHz applied to fiber, walls grounded, parallel plate reactor
[b]7.5 kV at 8 kHz applied to fiber, cylindrical plate reactor Example 6

Indirect Exposure

In some applications it may be desirable to avoid exposing the fiber directly to the plasma (to minimize sputtering effects, for example). To examine the effectiveness of indirect exposure, a cylindrical version of the parallel plate configuration used in direct exposure was used in conjunction with a rotating sample holder attached downstream of the exit. The plasma was generated in air using 12 kV at 6 kHz. The flow of inlet air was 2 cfm and the humidity of the air was held constant at 2.5 mm Hg. The fibers were exposed to the gas stream exiting the plasma volume but were not directly exposed to the plasma. As before, multiple XPS scans were made on the fibers and the results are presented in Table 6.

TABLE 6

Indirect processing using gas stream from a plasma generator

| Sample | Gas | Time, s | Surface O (fresh) |
|---|---|---|---|
| 9 | Air | 90 | 9.6 ± 1.4 |
| 10 | Air | 180 | 9.1 ± 1.5 |
| 11 | Air | 180 | 11.9 ± 1.1 |

The use of vacuum plasma processing of carbon fiber (either via direct exposure or remote exposure) for surface energy enhancement is well known in the art. It will be appreciated that Applicants' use of atmospheric plasma simplifies the production process by removing the usual batch-processing requirement created by vacuum plasma processing equipment. The inventive process achieves surface energy values higher than the standard industrial processes without the use of vacuum-based processing equipment. A preferable approach to generating atmospheric plasma is the One Atmosphere Uniform Glow Discharge Plasma (OAUGDP) or atmospheric diffuse mode dielectric barrier type plasma because this allows for a more efficient use of the plasma volume as taught in U.S. Pat. Nos. 5,387,842 and 5,414,324. Other types of plasma generators may be used in other embodiments of Applicants' process. In addition to the volumetric efficiency of these spatially uniform plasmas, the non-filamentary character of these plasma discharges enhances control of the plasma etching to insure a uniform degree of treatment of each individual carbon fiber filament within the tow. Furthermore, the atmospheric plasma processing system eliminates any effluent that is commonly created from an electrostatic process. While ozone may be present within the gas chemistry of the inventive process and devices, the results achieved are significantly higher than that achieved with ozone alone.

In order to provide a better understanding of the theoretical basis for Applicants' approach, the following discussion of filamentary versus non-filamentary atmospheric pressure plasma discharges is provided. [Reference is made to Rahel, J., and Sherman, D. M., "The transition from a filamentary dielectric barrier discharge to a diffuse barrier discharge in air at atmospheric pressure", J. Phys. D: Appl. Phys. 38 (2005), the entirety of which is incorporated herein by reference.] As known by those skilled in the art of plasma physics, atmospheric pressure plasma discharges can be classified into two categories based on the fundamental nature of the plasma discharge. Filamentary discharges are composed of microfilaments of current, pinpoint-like in character, that have localized energies sufficiently high to cause damage to delicate substrates in contact with the filamentary plasma discharge. Uniform treatment of a sample placed in such discharge requires some means of spatial averaging, and even then there is a tendency to overly damage the sample. Examples of filamentary plasma discharges would include corona, dielectric barrier discharges, and slot or micro-hollow cathode discharges. Atmospheric pressure non-filamentary discharges are plasma devices in which the pinpoint-like character of the current within the plasma is absent. This can be accomplished by a variety of mechanisms, such as operating the plasma comprising inert gases, operation within an after-glow of a plasma device, or tailoring the plasma discharge characteristics such that the filamentary structure is suppressed or diffused as taught in U.S. Pat. Nos. 5,387,842 and 5,414,324. Examples of non-filamentary or diffuse plasma discharges would include low pressure glow discharges, diffuse barrier discharges, the after-glow of atmospheric pressure jet discharges and similar discharges.

Distinguishing between a filamentary plasma discharge and a non-filamentary discharge in most cases can be accomplished by visual inspection if the plasma device is configured such that the one or both of the electrodes is transparent. Using a transparent electrode allows for the light emission from the plasma to be seen both the human eye and by a photomultiplier tube. Both the current waveforms and the photon emission for both a filamentary dielectric barrier discharge (FDBD) and a diffuse (non-filamentary) barrier discharge (DBD) contain features that may be used to readily distinguish the two types of discharge, as discussed in detail in the cited reference [Rahel and Sherman (2005)].

While the results of vacuum based plasma processing could be similar to atmospheric pressure based plasma system, the advantages of Applicants' atmospheric pressure process include: lower capital and operating costs; easier implementation in an industrial environment; reduced need for vacuum seals; and easier adaptation to continuous processing.

Figure 2:
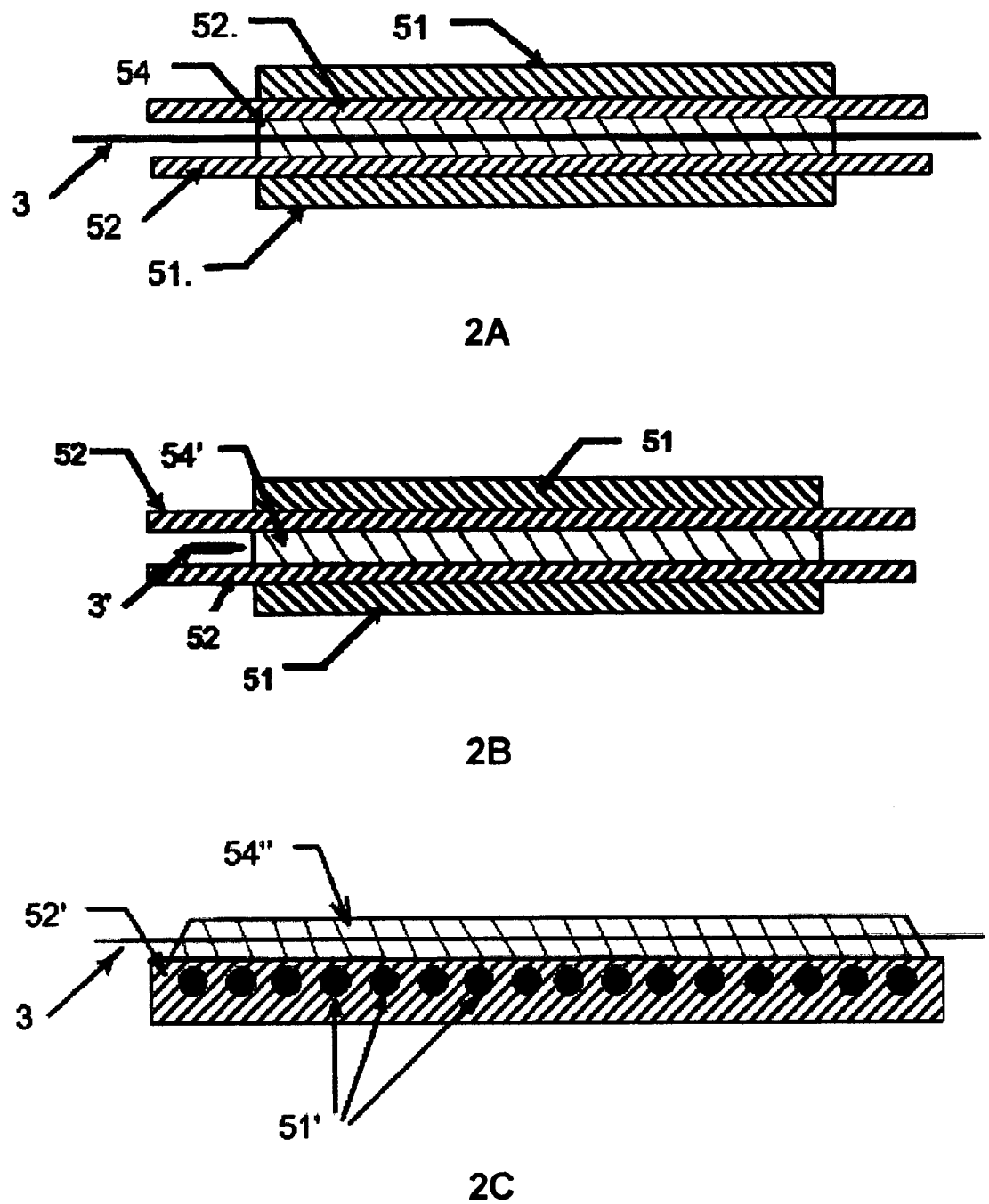
FIG. 2 is a schematic diagram of three alternate designs for exposing the fiber tow to plasma-derived reactive oxidative species.

There are many possible ways of delivering the reactive species from the plasma to the fiber material. As previously noted, these designs can be categorized by either placing the fiber within or outside of the plasma discharge that is either volumetrically generated between two electrodes or a surface discharge such that the plasma is a thin volume of plasma above a surface of dielectric. Those skilled in the art will appreciate that the inventive process may alternatively be accomplished by placing the fiber in the vicinity immediately outside of the plasma volume as well as within the smaller volume of a surface discharge. The advantage of placement in close proximity to, but not within, a plasma discharge is that the plasma could be operated at even higher energy levels that would otherwise create unacceptable amounts of detrimental etching of the fiber. These higher energy levels would allow for greater concentrations of reactive species and promote more rapid treatment of the fiber. The advantage of a surface discharge for fiber processing either within or immediately downstream of the surface plasma is that the plasma surface has higher electric field strengths, is easier to access, and is considerably simpler to maintain. FIG. 2 shows schematically several design variants. In each case, the figure shows a cross-sectional view of a substantially planar geometry.

FIG. 2A illustrates a fiber tow 3 passing between parallel electrodes 51 with dielectric layers 52. In this case, the fiber passes through the plasma 54, wherein it is directly exposed to reactive species. The plasma 54 is non-filamentary in nature.

FIG. 2B illustrates a similar electrode and dielectric configuration as shown in FIG. 2A; however, in this case the fiber consists of a flat coil of tow 3' disposed outside of the plasma 54'. Reactive species arising in the plasma 54' are convected out of the plasma and come into contact with the fiber 3'. Because the fiber is not directly immersed in the plasma 54', this plasma may be filamentary or non-filamentary in nature.

FIG. 2C illustrates another configuration, in which a series of parallel electrodes 51' are embedded in a planar dielectric 52' and create a surface plasma discharge 54". If the surface plasma is diffuse (non-filamentary), the fiber 3 may be immersed within the plasma as shown. Alternatively, if the plasma is filamentary the fiber may be displaced upward so that it lies outside of the plasma discharge but still dose enough to become exposed to the reactive species originating within the plasma 54".

Alternate Embodiments for Direct Exposure

The high electrical conductivity and small diameter of the individual fibers within the fiber bundle can create many challenges to a plasma processing system, particularly in electrically shorting the electrode system. While an insulated parallel plate arrangement is preferred for scaling up to a large number of fiber tows, it may be desirable to contain the fibers in a dielectric cavity as they are drawn through the plasma device. Such confinement will mitigate electrical shorting of the plasma generating electrodes.

Additionally, an array of tubular geometric electrodes with insulated interiors is also feasible. In this case the fiber bundles are divided and passed through the insulated interiors, with the conductive fiber electrically connected to comprise one of the required high voltage electrodes while the insulated tubular electrodes comprise the other one.

With the assumption of a well-insulated system, other geometric configurations of the electrodes are also feasible. These other configurations would include, but are not limited to, rods to flat plate, rods to rods, concentric plates, and various surface discharge configurations. Furthermore, assuming the proper electric field is generated that leads to the formation of the plasma, only one electrode has to be insulated assuming that the fiber has the same potential as the non-insulated electrode.

Alternate Embodiments for Indirect Exposure

There are a large number of electrode configurations that could be employed to generate the plasma exhaust required to treat the fiber. The primary requirements are sufficient exhaust velocity to transport the short-lived active species, sufficient gas residence time within the plasma, and the proper electrical operating conditions sufficient for creating the required short-lived active species. It will be appreciated that the carbon fiber must be located at a distance from the plasma source wherein the desired concentration of reactive species exists in the exhaust stream; the optimal location may be determined through routine experimentation. Useful plasma device configurations include, but are not limited to, flat plate to flat plate, rods to flat plate, rods to rods, concentric plates, and various surface discharge configurations as are familiar to those skilled in the art of plasma generation. The requirement for non-filamentary plasma discharges may also be relaxed for indirect plasma exposure because the fiber is physically located outside the boundary of the plasma discharge and therefore safely away from the destructive filaments.

It will be appreciated that the carbon fibers may be supported during the process by a number of different methods. As used herein, the term "means of support" can include supporting structures that may reside either inside or outside of the treatment chamber. For a batch-type process, the preferred support will be a generally flat surface upon which the fiber material may rest, the surface preferably being a dielectric material. For a continuous process, the preferred support comprises a feed reel and a take-up reel, both generally located outside of the treatment chamber. In this case the fiber is suspended between these reels and preferably held in a controlled state of tension preventing it from touching or dragging on the internal surfaces of the treatment chamber. As is well known in the art, the reels may further be disposed to spread a fiber tow from its naturally cylindrical shape into a generally flat or ribbon-like configuration for better management of heat and gas flow around the fibers. It will be understood that the entire process may be conducted with the fiber following a substantially horizontal path as shown in the examples or with the path oriented vertically if desired (for example, to reduce the amount of floor space occupied by the equipment). The system may further be configured to allow for the fiber to make more than one pass through the treatment chamber if desired. In another embodiment, a continuous conveyor system may be provided, for example, to move a chopped fiber product through the treatment chamber.

It will be appreciated that the optimal temperature for carrying out the inventive process will vary somewhat depending on the type of fiber, the intended polymer matrix, and other engineering considerations. In general, the process may be carried out from about 20 to 300° C. and more preferably from about 20 to 150° C.

Applicants do not regard the particular embodiment of the plasma configuration as critical except that processing of the fiber item within the plasma discharge must be accomplished within a non-filamentary plasma discharge. An alternate means of achieving this condition is to process the workpiece in either the after-glow or exhaust of a plasma device such that convection of the required oxidative chemistry is accomplished in a short enough time to allow the item to undergo the surface modification. There are many plasma devices that one of ordinary skill in the art of plasma science may utilize to accomplish this process. It will be further appreciated that if the plasma is generated in a first location and the reactive species are transported from there to the treatment chamber, various incidental processes may be performed on the reactive species, such as heating or cooling the gas stream to a desired temperature prior to its contacting the fiber. This incidental processing might in some cases change the chemical composition of the reactive species or change the relative proportions of the various gaseous species. As one example of this embodiment of the invention, the plasma may be configured to create a large concentration of ozone, which may then be heated to decompose the ozone into atomic oxygen before introducing it into the treatment chamber. Thus, a conduit provided to carry the plasma-derived species into the processing chamber may contain such well known structures as heaters, heat exchangers, radiative cooling fins, and the like as are familiar in the art.

Those skilled in the art of plasma devices and processes will appreciate that control of the plasma device may involve any or all of the following parameters: voltage; frequency; current; power; and waveform density (pulsing or duty-cycle). The selection of a complete process for a particular carbon fiber product and a particular application will involve the application of routine engineering analysis to select and optimize the following system parameters: plasma device and geometry; gas mixture and flow-rates; gas pressure; temperature; processing residence time; and composition of item undergoing processing.

It will be further understood that the description of exemplary processes using atmospheric pressure plasma processing should not be interpreted to limit the inventive process to precisely one atmosphere; on the contrary, the claimed process may be performed at any selected pressure near ambient, which might be somewhat less than or more than one atmosphere. Furthermore, the temperature of the fiber during processing may be maintained at substantially ambient temperature, the fiber temperature may fluctuate somewhat with exposure to the plasma, or the fiber may be actively heated or cooled, depending on the needs of a particular application.

What is claimed is:

1. A method for treating carbon fiber comprising:
biasing a tow of carbon fiber to provide a first electrode;
wetting an exposed surface of at least one carbon fiber of said tow of carbon fiber with an oxygen-containing species in its liquid state prior to subjecting said at least one carbon fiber to a non-filamentary plasma discharge; and
forming said non-filamentary plasma discharge between the first electrode and a second electrode; and
exposing the oxygen-containing liquid that is present on the exposed surface of said at least carbon fiber to said non-filamentary plasma discharge, wherein the oxygen-containing liquid dissociates to provide at least one oxidative species that modifies the surface energy of said at least one carbon fiber to have a greater chemical affinity to polymeric based matrixes.

2. The method of claim 1, wherein the at least one oxidative species oxidizes the exposed surface of the at least one carbon fiber.

3. The method of claim 1, wherein the exposure of the at least one carbon fiber to the at least one oxidative species reduces the surface energy of the at least one carbon fiber.

4. The method of claim 1, wherein the oxygen-containing liquid comprises water or an organic compound comprising carbonyl, carboxyl, alcohol, ester, or ether groups.

5. The method of claim 1, wherein said non-filamentary plasma discharge is conducted at substantially one atmosphere pressure.

6. The method of claim 1, wherein the oxygen-containing liquid has a viscosity less than about 500 cp.

7. The method of claim 1, wherein the biasing of the tow of the carbon fiber comprises applying a bias to the tow of carbon fiber outside a region where the non-filamentary plasma discharge is formed.

8. The method of claim 1, wherein the forming of the non-filamentary plasma discharge between the first electrode and a second electrode is at 1 atmospheric pressure (atm).

9. The method of claim 1, wherein exposure of the oxygen-containing liquid present on the exposed surface of the at least one carbon fiber to the non-filamentary plasma discharge roughens the exposed surface of the at least one carbon fiber.

10. The method of claim 1, wherein said non-filamentary plasma discharge is provided by a plasma processing device comprising a gas supply, a plasma reactor and a power supply, wherein the gas supply provides a working gas comprising at least one species selected from the group consisting of: air, $O_2$, $N_2$, $H_2O$, CO, $CO_2$, $NH_3$, $CH_4$, nitrogen oxides, He, Ar, C-1 to C-8 hydrocarbons, organic acids, ketones and aldehydes.

11. The method of claim 1, wherein said second electrode is an oil-heated electrode insulated with glass plates.

12. The method of claim 1, wherein said non-filamentary plasma discharge is selected from the group consisting of low pressure glow discharge, diffuse barrier discharge, after-glow of atmospheric pressure jet discharge, and combinations thereof.

13. The method of claim 1, wherein the second electrode is a series of parallel electrodes embedded in a planar dielectric, wherein the planar dielectric is a dielectric material selected form the group consisting of borosilicate glass, quartz, alumina, and combinations thereof.

14. A method for treating carbon fiber comprising:
applying a plasma discharge to a gas in a first chamber to produce at least one reactive species; and
exposing at least one carbon fiber to the at least one reactive species at substantially one atmosphere pressure in a second chamber, in which the second chamber is separated from the first chamber and is connected to the first chamber by a conduit, wherein exposure of the at least one carbon fiber to the reactive species modifies the surface energy of the at least one carbon fiber to have a greater chemical affinity to polymeric based matrixes, wherein the at least one carbon fiber is not exposed to the plasma discharge that is produced in the first chamber.

15. The method of claim 14, wherein the temperature of the at least one reactive species is maintained between about 20° C. to about 300° C. in the conduit prior to the introduction of the reactive species into the second chamber.

16. The method of claim 14, wherein the at least one reactive species is ozone and the ozone is heated in the conduit to facilitate decomposition, wherein the at least one reactive species introduced into said second chamber includes atomic oxygen.

17. The method of claim 14, wherein the plasma discharge is a filamentary plasma discharge or a non-filamentary plasma discharge.

18. The method of claim 14, wherein the plasma discharge is established using a working gas comprising at least one species selected from the group consisting of: air, $O_2$, $N_2$, $H_2O$, CO, $CO_2$, $NH_3$, $CH_4$, nitrogen oxides, He, Ar, C-1 to C-8 hydrocarbons, organic acids, ketones and aldehydes.

19. The method of claim 14, further comprising applying an oxygen-containing liquid directly to at least one carbon fiber before exposing at least one carbon fiber to the at least one reactive species.

20. The method of claim 14, wherein the plasma discharge is provided by a plasma device consisting of flat plate to flat plate, rods to flat plate, rods to rods, concentric plates, and combinations thereof.

* * * * *